(12) United States Patent
Sundaram et al.

(10) Patent No.: US 7,313,797 B2
(45) Date of Patent: Dec. 25, 2007

(54) UNIPROCESSOR OPERATING SYSTEM DESIGN FACILITATING FAST CONTEXT SWITCHING

(75) Inventors: Anand Sundaram, Sunnyvale, CA (US); Maarten Koning, Bloomfield (CA)

(73) Assignee: Wind River Systems, Inc., Alameda, CA (US)

(*) Notice: Subject to any disclaimer, the term of this patent is extended or adjusted under 35 U.S.C. 154(b) by 828 days.

(21) Appl. No.: 10/246,830

(22) Filed: Sep. 18, 2002

(65) Prior Publication Data

US 2004/0055003 A1   Mar. 18, 2004

(51) Int. Cl.
G06F 9/46 (2006.01)
(52) U.S. Cl. .................... 718/108; 712/228
(58) Field of Classification Search ........ 718/100–108; 712/228
See application file for complete search history.

(56) References Cited

U.S. PATENT DOCUMENTS

| | | | | |
|---|---|---|---|---|
| 4,296,470 A | * | 10/1981 | Fairchild et al. | 710/269 |
| 4,338,662 A | * | 7/1982 | Yokoyama | 712/244 |
| 5,390,329 A | * | 2/1995 | Gaertner et al. | 718/108 |
| 5,440,703 A | * | 8/1995 | Ray et al. | 712/228 |
| 5,475,822 A | * | 12/1995 | Sibigtroth et al. | 712/228 |
| 5,872,909 A | * | 2/1999 | Wilner et al. | 714/38 |
| 5,872,963 A | * | 2/1999 | Bitar et al. | 712/233 |
| 5,987,495 A | * | 11/1999 | Ault et al. | 718/108 |
| 6,128,641 A | * | 10/2000 | Fleck et al. | 718/108 |
| 6,205,468 B1 | * | 3/2001 | Diepstraten et al. | 718/108 |
| 6,243,736 B1 | * | 6/2001 | Diepstraten et al. | 718/108 |
| 6,260,150 B1 | * | 7/2001 | Diepstraten et al. | 713/323 |

(Continued)

OTHER PUBLICATIONS

IBM Technical Disclosure Bulletin. "Deterministic Context Switching of Registers." Nov. 1, 1989.*
Hsiao, Shawn et al. "Context Switching and Scheduling in C—" May 11, 2000.□□.*

(Continued)

Primary Examiner—Lewis A. Bullock, Jr.
(74) Attorney, Agent, or Firm—Fay Kaplun & Marcin, LLP

(57) ABSTRACT

A task stack and a context pointer in a task control block (TCB) are implemented to provide more efficient context switching. Additionally, multiple routines each of which saves or restores a certain combination of volatile registers is implemented. A task can store in its task control block a routine identifier to select from the multiple routines a set of routines for saving and restoring volatile registers during context switching. On the occurrence of an event that may lead to a context switch a scheduler selects based on the routine identifier a routine that only saves registers used by the task, thereby, reducing execution overhead. The registers are saved on the task stack and a context pointer to the registers is saved in the TCB. In the event a context switch is necessary, it is not necessary to copy the registers to the TCB because the context pointer is in the TCB. A non-volatile register indicator that indicates whether non-volatile registers are used is stored in the task control block. The non-volatile registers are only saved if used, also reducing execution overhead. Furthermore, a storage area is implemented for saving task context for the task when it is interrupted during context switch in. Upon the occurrence of an interrupt the task context is saved in the storage area. If the interrupt leads to a second task which has a higher priority being made ready, the second task is switched in without first returning to switch-in the task.

23 Claims, 10 Drawing Sheets

U.S. PATENT DOCUMENTS

| | | | |
|---|---|---|---|
| 6,374,286 B1 * | 4/2002 | Gee et al. | 718/108 |
| 6,553,487 B1 * | 4/2003 | Sukonik et al. | 712/228 |
| 6,671,762 B1 * | 12/2003 | Soni et al. | 710/267 |
| 6,895,583 B1 * | 5/2005 | Koning | 718/100 |
| 6,904,517 B2 * | 6/2005 | Nevill et al. | 712/228 |
| 6,986,141 B1 * | 1/2006 | Diepstraten et al. | 718/108 |
| 2003/0051123 A1 * | 3/2003 | Takamuki | 712/228 |

OTHER PUBLICATIONS

Davidson, Jack W. et al. "Methods for Saving and Restoring Register Values across Function Calls." Feb. 1991.*

Snyder, Jeffrey S. et al. "Fast Context Switches: Compiler and Architectural Support for Preemptive Scheduling." 1995.*

Ball, Tony. "Real Time Operating System Performance Issues and Techniques with RISC." IEEE. Nov. 1991.*

* cited by examiner

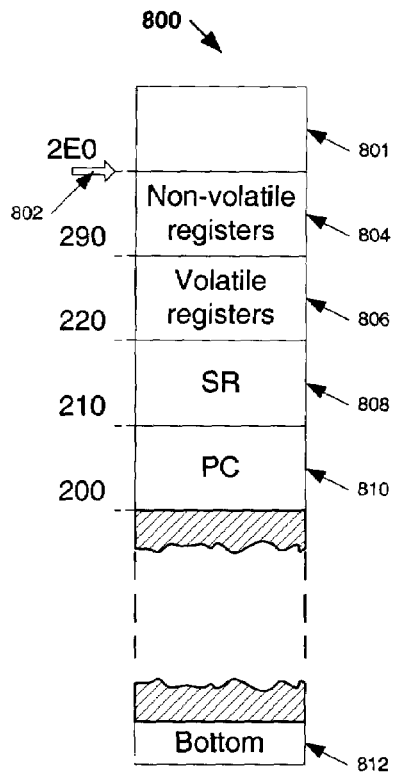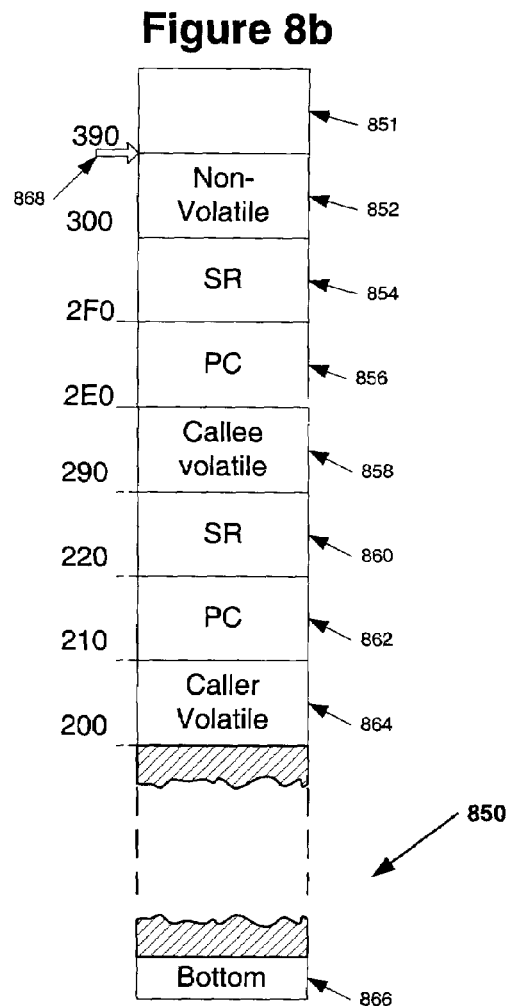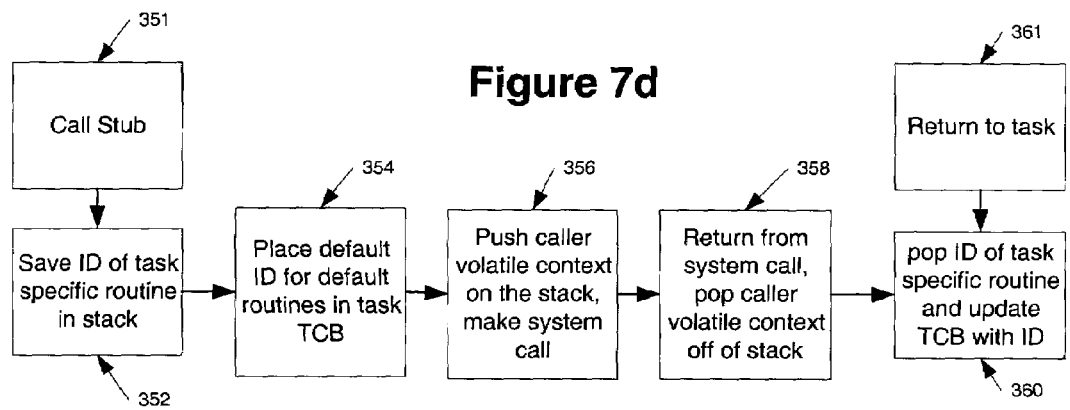

UNIPROCESSOR OPERATING SYSTEM DESIGN FACILITATING FAST CONTEXT SWITCHING

BACKGROUND INFORMATION

Traditional multitasking operating systems (e.g., UNIX, Windows) have been implemented in computing environments to provide a way to allocate the resources of the computing environment (e.g., CPU, memory, Input/Output (I/O) devices) among various user programs that may be running simultaneously in the computing environment. The operating system itself comprises a number of functions (executable code) and data structures that may be used to implement the resource allocation services of the operating system.

Operating systems have also been implemented in a so-called "object oriented" manner. That is, when a particular function and/or data structure (defined by a "class" definition) is requested, the operating system creates ("instantiates") an "object" that uses executable code and/or data structure definitions specified in the class definition. Such objects thus may contain executable code, data structures, or both. Objects that perform actions are typically referred to as "tasks" (also known as "threads"), and a collection of tasks may be referred to as a "process." Upon loading and execution of the operating system into the computing environment, system tasks and processes will be created in order to support the resource allocation needs of the system. User applications likewise upon execution may cause the creation of tasks ("user tasks"), processes ("user processes"), and other objects in order to perform the actions desired from the application.

While some operating systems apportion the computing environment's execution "space" (e.g., its memory) into a "system" space and a "user" space and prevent each task running in the computing environment from interfering with the operating system and other tasks also running in the computing environment, other operating systems do not enforce a protection model ("non-protected operating systems"). In non-protected operating systems it is incumbent upon each task to be well-behaved and only operate within its apportioned fraction of the user space. Even though the non-protected operating system may not check to see whether a task is well-behaved and operating only within its apportioned memory space, the execution space is generally organized in a manner similar to that of "protected operating systems." The system space generally contains the code and data structures for the operating system tasks, while the user space contains the code and data structures for user tasks.

Conceptually, the "non-protected model" for a computer system is illustrated in FIG. 1a. In a computer system 1 controlled by an operating system 2, there may be any number of user processes 3 and system tasks 5 executing at one time. User processes 3 each include a number of user tasks 6. Even though each user process 3 is only allocated a portion of the system memory, the operating system 2 does not restrict direct access by any user task 6 affiliated with a particular user process 3 to the memory allocated to another process, including the operating system itself as indicated by direct connections 4 between processes and direct connections 7 between processes and the operating system.

A "protected model" for a computer system is illustrated in FIG. 1b. In a computer system 10 controlled by an operating system 12, there may be any number of user processes 13 and system tasks 15 executing at one time. User processes 13 each include a number of user tasks 16. Because each user process 13 is only allocated a portion of the system memory, the operating system 12 may restrict access by any user task 16 affiliated with a particular user process 13 to the memory allocated to another process, including the operating system itself; hence the dashed lines 14. Typically, however, system tasks 15 have unrestricted access to the memory allocated to the operating system 12 and the memory allocated to each user process 13 (indicated by direct connections 17).

Certain operating systems, defined as "real-time operating systems," have been developed to provide a more controlled environment for the execution of application programs. Real-time operating systems are designed to be "deterministic" in their behavior—i.e., responses to events can be expected to occur within a known time of the occurrence of the event, without fail. Determinism is particularly necessary in "mission-critical" applications, although it is generally desirable for all operating systems in order to increase reliability. Real-time operating systems are therefore implemented to execute as efficiently as possible with a minimum of execution overhead.

One area where efficiency issues may arise in a real-time multitasking operating system is "context switching." A context switch causes the CPU to stop executing the currently running task and start executing another task. This context switch may occur for many reasons, for example: the executing task needs to relinquish the CPU because it has to wait for a system resource to become available, or an interrupt service routine (ISR) may have interrupted the executing task and caused another task to have a higher priority than the executing task (i.e., task preemption). When a context switch occurs, information about the state of the currently executing task needs to be saved so that the task may continue executing later without change in the environment. The state information includes control information about the task itself (e.g., register and program counter values), and information related to the state of resources being used by the task (e.g., pointers). The more information that needs to be saved during the context switch, the more time the context switch requires, thus increasing execution overhead. Similarly the more information that needs to be restored during a context switch-in the more time the context switch-in requires, increasing execution overhead before a task can start execution.

The issue of execution overhead in context switching arises in several situations. First, for example, C compilers typically follow the application binary interface (ABI) for a processor in emitting code for a function (caller function) making a function call (callee function). The ABI interface requirements are followed by C compilers for C functions making system calls. A C function making a system call is referred to as a "caller function" and the system call is referred as the "callee function." To fulfill the ABI requirements a compiler emits code which saves the caller function's volatile registers (hereinafter "caller volatile context") before the system call is made and emits code which saves the callee functions volatile registers (hereinafter "callee volatile context") before beginning the system call. Upon invoking and executing a system call, due to the code produced by the compiler task, context information is saved. If the system call cannot be completed because a system resource is unavailable at the present time, the task relinquishes the CPU and a context switch is performed so that another task can begin execution. During the context switch the task context information that was saved by the compiler is saved again. Saving again the task context information that has already been saved needlessly lengthens the context switch time, increasing execution overhead. Another source of inefficiency occurs because task context information that is not saved by the compiler and was not used by the task is saved anyway. Also saving during context switch task context information that was not used by the task increases execution overhead.

Second, similarly, needless saving of unused context information also occurs when a task gets preempted due to an interrupt. Task state information is typically maintained in a "task control block" for each task. The task control block is typically stored in the system space since most of the information in the task control block is needed for context switching purposes only. When a task that is being executed is interrupted the task context is saved on the system stack. Some of the task context that is saved on the system stack is information that is not used by the task. Saving information that is not used by the task increases execution overhead if the interrupt ultimately leads to a context switch.

Third, another inefficiency arises after the task context is saved on the system stack. After the task context is saved, an ISR is executed. If at the end of the ISR it appears that a new task, which has a higher priority than the interrupted task, was made ready by the ISR a context switch is performed. The context switch involves first taking the task context that had been saved on the system stack and saving it in the task control block of the task that had been interrupted and then taking the appropriate task state information from the task control block of the higher priority task and placing it in the proper CPU registers and program counter. It should be appreciated that execution overhead is increased by the second step of saving the task context: i.e., copying the task context of the interrupted task from the stack to the task control block of the interrupted task. Also, as indicated above, some of the information on the stack is information that is not used by the task. Copying information that is not used by the task to the task control block increases execution overhead needlessly.

Fourth, another situation where execution overhead is increased occurs during the process of switching in a task context (context switch-in). Due to the length of time required to perform a context switch-in, it is possible for an interrupt to occur during that time. The context switch-in is interrupted and an ISR is executed. After the ISR has finished executing the context switch-in resumes execution even if the ISR made a task with a higher priority than the task being context switched-in ready. Sometime after the context switch-in is substantially finished and before the task being switched-in begins execution the scheduler checks to see if the task being switched in and about to be executed has not been preceded by a higher priority task (i.e., the ISR that was just executed made a higher priority task ready). If the scheduler determines a higher priority task is ready a switch-in is then performed for the higher priority task. However, the higher priority task was made ready much earlier by the ISR. Even though the higher priority task was made ready by the ISR it was not switched in immediately. Rather code to context switch-in the lower priority task needlessly resumes, increasing execution overhead.

SUMMARY OF THE INVENTION

A task stack and a context pointer in a task control block (TCB) are implemented in an embodiment to provide more efficient context switching. Additionally, in an embodiment multiple routines each of which saves or restores a certain combination of volatile registers is implemented. In an embodiment, a task can store in its task control block a routine identifier which is used to select a set of routines from the multiple routines for saving and restoring volatile registers during context switching. On the occurrence of an event that may lead to a context switch a scheduler selects based on the routine identifier a routine that only saves registers used by the task, thereby, reducing execution overhead. The registers are saved on the task stack and a context pointer to the registers is saved in the TCB. In the event a context switch is necessary, it is not necessary to copy the registers to the TCB because the context pointer is in the TCB. In one embodiment, a non-volatile register indicator that indicates whether non-volatile registers are used is stored in the task control block. The non-volatile registers are only saved if used, also reducing execution overhead.

Furthermore, in one embodiment, a storage area is implemented for saving task context for the task when it is interrupted during context switch in. Upon the occurrence of an interrupt the task context is saved in the storage area. If the interrupt leads to a second task which has a higher priority being made ready, the second task is switched in without first returning to switch-in the task.

BRIEF DESCRIPTION OF THE DRAWINGS

The present invention is illustrated by way of example, and not limitation, in the figures of the accompanying drawings in which like references denote similar elements, and in which:

FIG. 7c illustrates a process for storing task context in response to an interrupt during task switch-in;

FIG. 7d illustrates a process for task context storage before a transition is made between types of code that have different task context storage requirements;

FIG. 8a illustrates the stack of a preempted task in the case where both non-volatile registers and volatile registers are stored;

FIG. 8b illustrates the stack of a task that relinquished the CPU and had both volatile registers and non-volatile registers stored before relinquishing the CPU.

DETAILED DESCRIPTION

According to the present invention, an operating system that includes an improved task context switching structure is described. In the following description, for purposes of explanation, numerous specific details are set forth in order to provide a thorough understanding of embodiments according to the present invention. It will be evident, however, to one skilled in the art that the present invention may be practiced in a variety of operating systems that are protected and non-protected, real-time operating systems that are protected and non-protected, and computing systems, without these specific details. In other instances, well-known operations, steps, functions and elements are not shown in order to avoid obscuring the description.

Parts of the description will be presented using terminology commonly employed by those skilled in the art to convey the substance of their work to others skilled in the art, such as kernel, user memory space, system memory space, task context, interrupt service routine, push, pop, stub, and so forth. Various operations will be described as multiple discrete steps performed in turn in a manner that is most helpful in understanding the embodiments according to the present invention. However, the order of description should not be construed as to imply that these operations are necessarily performed in the order that they are presented, or even order dependent. Lastly, repeated usage of the phrases "in one embodiment," "an alternative embodiment," or an "alternate embodiment" does not necessarily refer to the same embodiment, although it may.

Figure 1A:
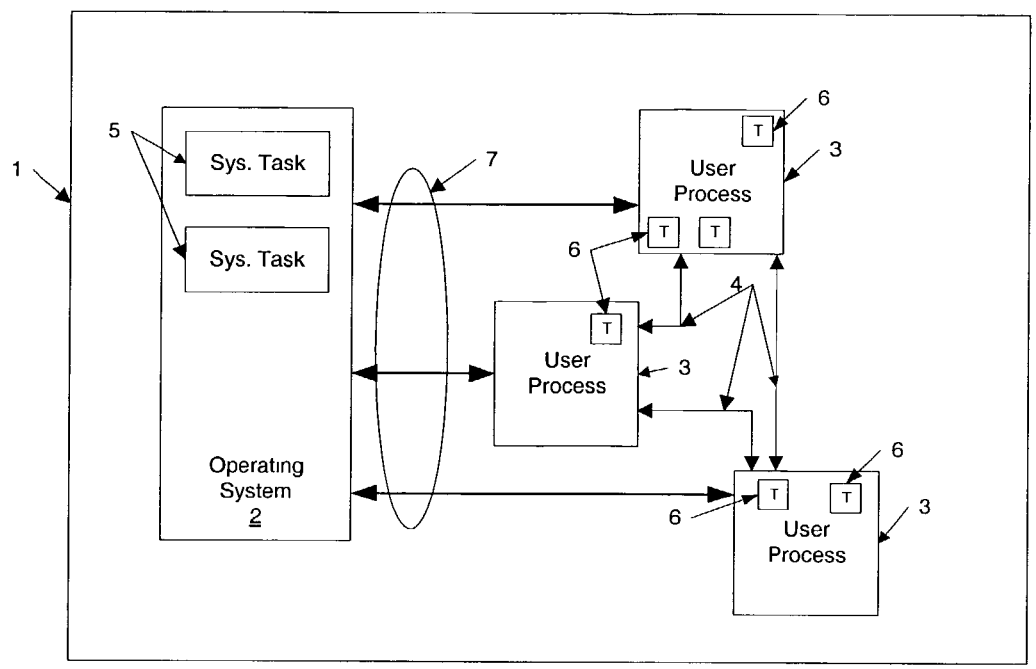
FIG. 1a illustrates, conceptually, a "non-protected model" for a computer system.
Figure 1B:
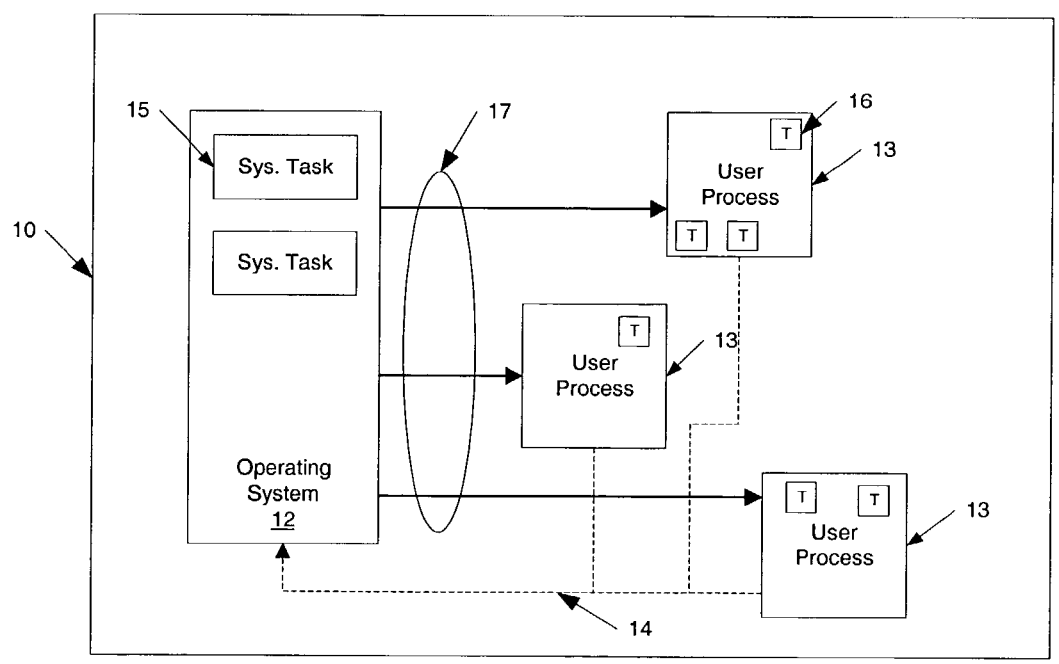
FIG. 1b illustrates, a "protected model" for a computer system.
Figure 2:
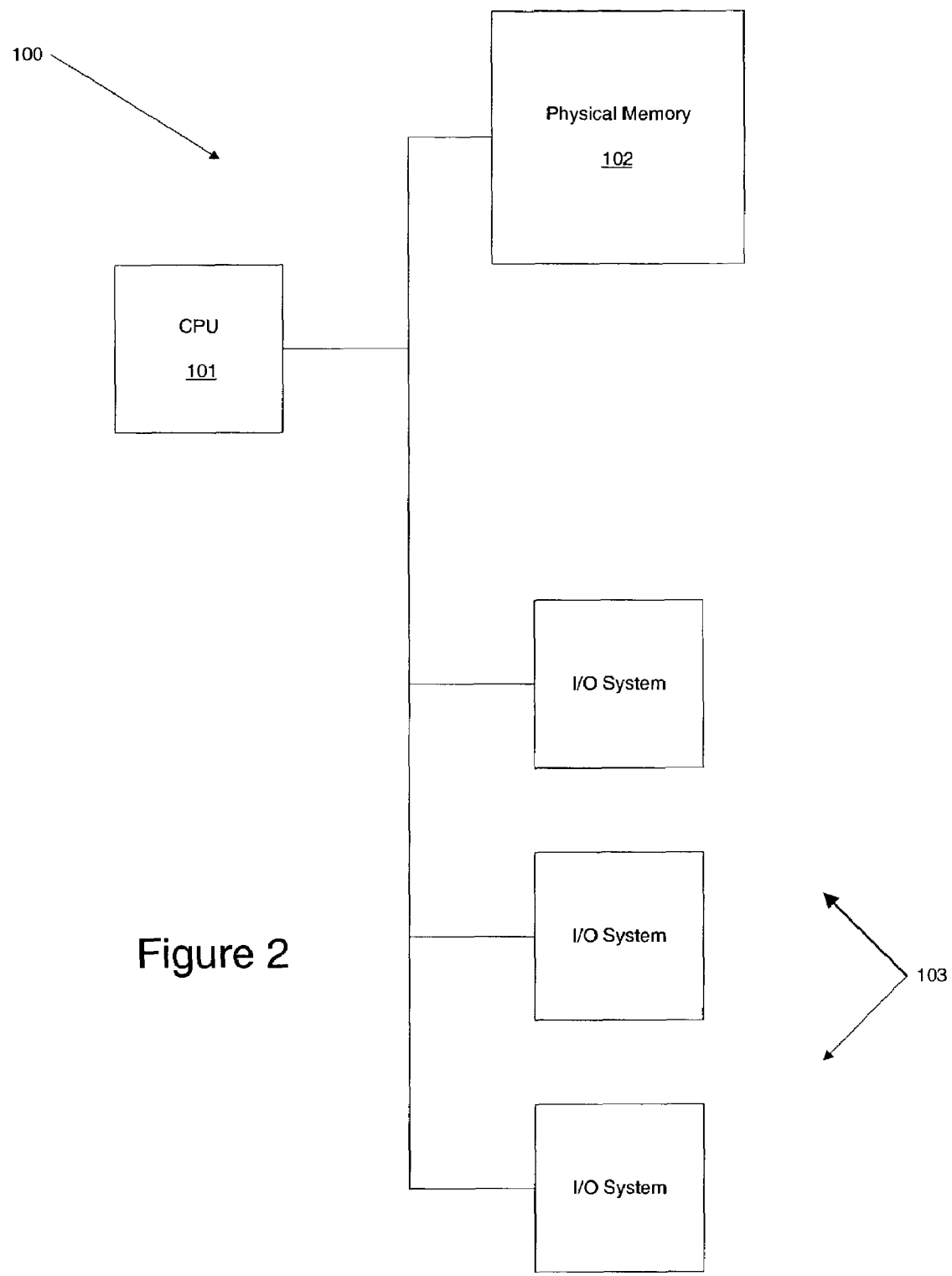
FIG. 2 illustrates a block diagram of a computer system according to an embodiment.

An exemplary embodiment of a computing environment implementing an improved task switching structure according to the present invention is illustrated by FIGS. 2-9. FIG. 2 is a block diagram of an exemplary computer system 100. Computer system 100 includes a CPU 101, which is coupled to a physical memory system 102 and a number of I/O systems 103. Connection of the CPU 101 to the physical memory system 102 and the number of I/O systems 103 may be according to any of the well known system architectures (e.g., PCI bus) and may include additional systems in order to achieve connectivity. I/O systems 103 may comprise any of the well-known input or output systems used in electronic devices (e.g., keypad, display, pointing device, modem, network connection). Physical memory system 102 may include RAM or other memory storage systems to provide operational memory, and read only memory and/or other non-volatile storage systems for storage of software (an operating system, other applications) to be executed in computer system 100. Alternately, software may be stored externally of computer system 100 and accessed from one of the I/O systems 103 (e.g., via a network connection). CPU 101 may also include a memory management unit (MMU, not shown) for implementing virtual memory mapping, caching, and other memory management functions, as is well known. While in the above description system 100 is a non-protected system that does not do any enforcement or checking to make sure that tasks do not interfere with other tasks and, thereby, relies on tasks to be well behaved, according to an alternative embodiment, CPU 101 performs privilege checking to enforce protection so that tasks do not interfere with other tasks or the operating system.

Figure 3:
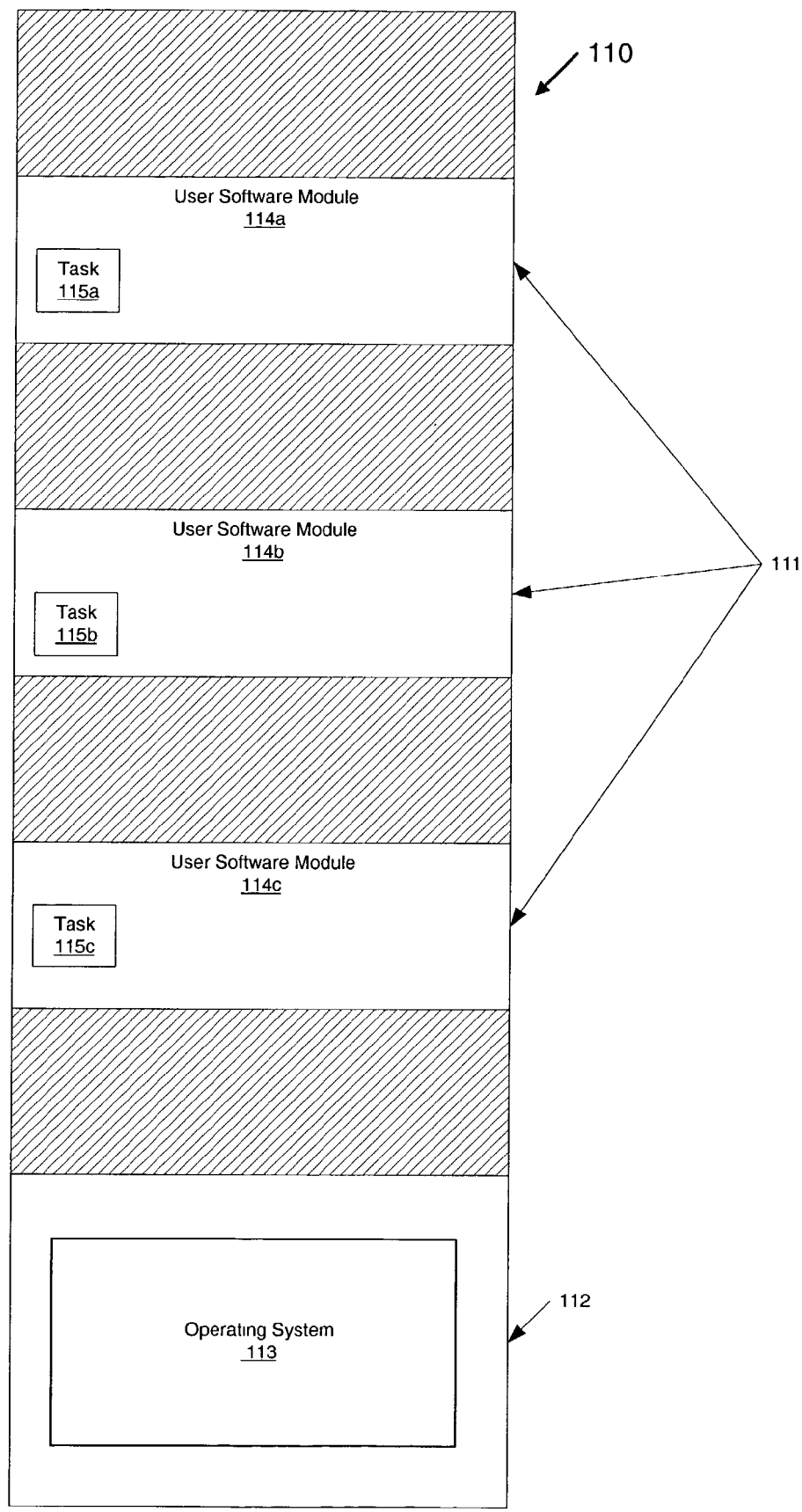
FIG. 3 illustrates an exemplary memory space of an exemplary computer system.

FIG. 3 illustrates an exemplary memory space 110 of exemplary computer system 100. Memory space 110 is, for example, an addressable virtual memory space available in the computer system 100 (which may be equal to or greater than the amount of physical memory provided in computer system 100, depending on system memory management implementations). Memory space 110 may also include memory locations assigned as "memory mapped I/O" locations, allowing I/O operations through the memory space 110.

Memory space 110 includes a system space 112 and a user space 111. Even though memory space 110 is divided into system space 112 and user space 111 it should be appreciated that the division does not necessarily mean that a protected model is being implemented (i.e., one in which tasks in user space are not free to modify directly the system space or the user space of other tasks). While in this exemplary embodiment a non-protected model for memory space 110 is described, an alternative embodiment encompassed by the present invention may use a protected model for the memory space of the computer system.

The system space 112 is used by an operating system 113 (for example, a real-time operating system) that controls access to all system resources (such as physical memory system 102 and I/O systems 103). The operating system 113 includes operating system functions (executable code) and data structures, as well as a number executing system tasks and system objects that perform system control functions (e.g., context switching between tasks). As shown in FIG. 3, user space 111 may include a number of user software modules 114 (in this example, three software modules 114a, 114b, 114c) that have been loaded into the memory space 110 after the operating system 113 has begun executing in system space 112. Each software module 114 may also include functions and data structures, which may be used by tasks executing in computing environment 100. The size of the system space 112 and user space 111 may be dynamically altered by the operating system 113 according to application need.

To illustrate the structure and operation of this exemplary embodiment, exemplary computing environment 100 further includes three user tasks 115 executing in the computing environment 100. User task 115a is executing functions from software module 114a, while user task 115b and user task 115c are executing functions from software modules 114b and 114c, respectively. In this example, user tasks 115 may directly access memory locations allocated to the system space 112. However, as noted above, in a protected model, tasks 115 may not directly access memory locations allocated to the system space 112, but rather must execute a system call to invoke an operating system function to provide indirect access (e.g., a function to return the value of an operating system variable).

Figure 4:
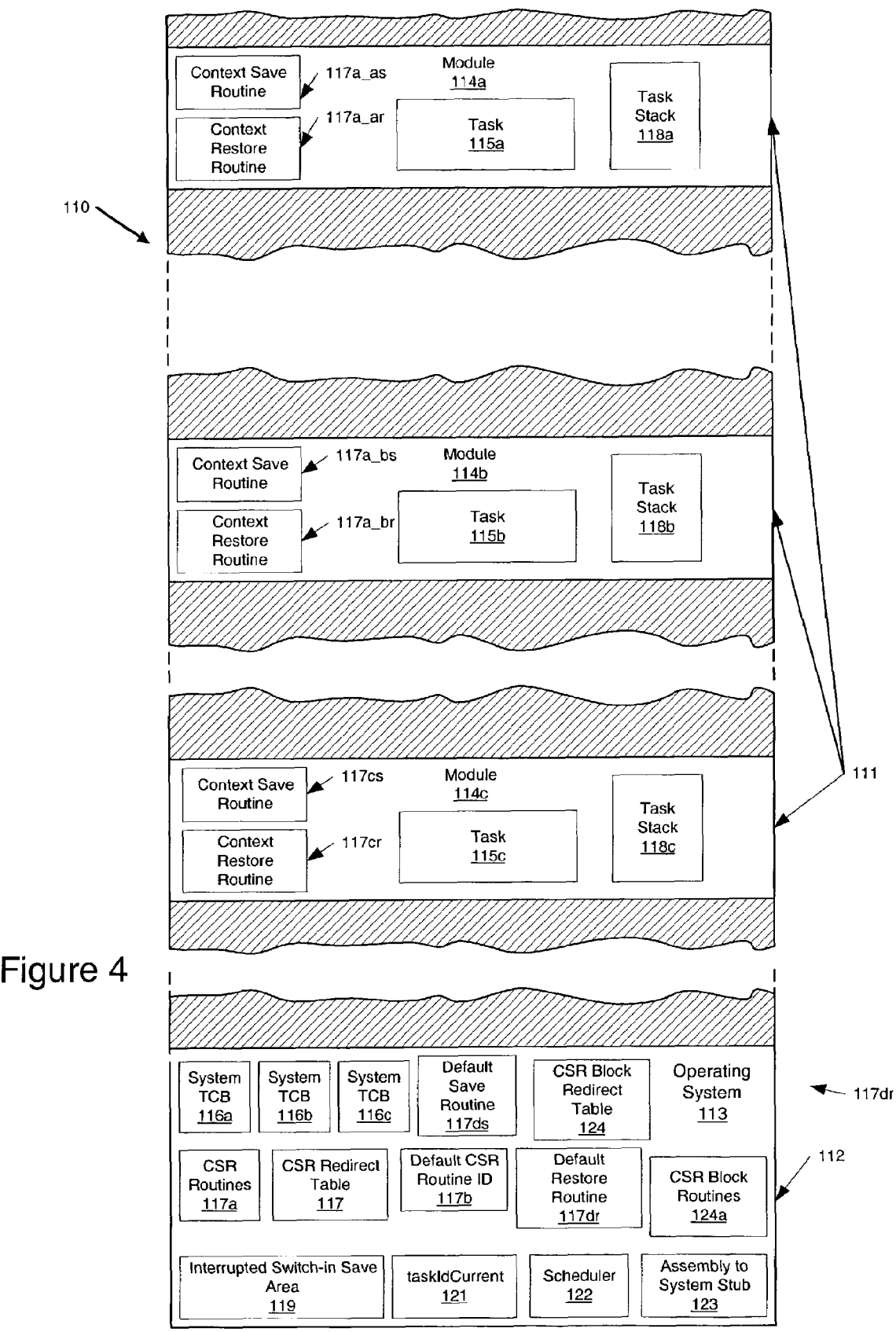
FIG. 4 shows a more detailed view of the memory space.

FIG. 4 shows a more detailed view of the memory space 110. Tasks 115a, 115b and 115c each have been assigned by operating system 113 (for example, during the creation of the task) a system task control block 116, and a task stack 118. System task control blocks 116 are located within system space 112. User task stacks 118 are located within user space 111, for example, in memory locations assigned to the modules 114 containing functions to be executed by the respective task 115. According to this exemplary embodiment, task 115a, for example, may directly access task stack 118a and system task control block 116 even though it is in system space 112. However, in an alternative embodiment using a protected model for memory space 110, user task 115a, for example, may directly access task stack 118a, but may not directly access system task control block 116a. Note that although only three system task control blocks 116 and task stacks 118 have been shown in this example, additional structures would be used if additional tasks 115 were executed. System space 112 further includes taskidCurrent 121 which contains the task ID (described below in connection with FIG. 5) of the task control block of the currently executing task.

Assuming that task 115a, for example, is currently executing, execution may have to switch from task 115a to task 115b, for example, for one of several reasons requiring the state of the computing environment, or task context, for task 115a to be stored and the task context for task 115b to be restored. Task context switching refers to storing the context of the task to be switched out of the processor and restoring the context of the task to be switched into the processor. Scheduler 122 in system space 112 recognizes that an event requiring a change in task execution has occurred and performs operations to store and restore context.

One reason for switching is that task 115a has to relinquish the CPU because it wants a system space 112 resource that is not presently available. Assuming that task 115b is the highest priority task waiting for CPU time and is ready for execution, instead of having task 115a tie up the CPU, task 115a relinquishes the CPU and execution is transferred to task 115b. Transferring execution to task 115b requires that the state of the computing environment for task 115b to be restored (i.e., the task context to be switched-in).

Another reason for switching is due to task 115a being interrupted causing an interrupt service routine (ISR) to run. Assuming task 115b is higher in priority than tasks 115a and 115c, if the ISR makes task 115b ready, scheduler 122 in operating system 113 will initiate the execution of task 115b, the highest priority task that is ready after an ISR has been executed.

Yet another reason execution may switch to task 115b is due to task 115c, for example, having used up its slice of CPU time causing task 115a to be switched-in because it is the next task to be executed. During switch-in of task 115a an interrupt may happen causing an ISR to run. Assuming task 115b is higher in priority than tasks 115a and 115c, if the ISR makes task 115b ready the scheduler 112 will cause task 115b to be executed, the highest priority task that is ready after the ISR has been executed.

As indicated above, to switch task context the state of the computing environment of the task being switched out is stored for later retrieval and the state of the computing environment of the task being switched in is restored and made accessible to the task that is given access to a slice of CPU time. The CPU registers are part of the state of the computing environment. According to one embodiment CPU registers are divided into two categories: 'volatile' registers and 'non-volatile' registers. Volatile registers are registers used by the compiler and whose values are not preserved across function calls. Non-volatile registers are registers used by the compiler and whose values are preserved.

In standard C compilers, every function can use all the volatile registers. The C Application Binary Interface (ABI) of the processor specifies the registers saved/restored by the function making a call (caller code) to another function (callee code). The set managed by caller code is the "caller volatile registers" and those by callee code is the "callee volatile registers." Since system calls are also written in the C language, the caller of a system call function has to conform to the C ABI (i.e., store the caller volatiles). For a C task which includes a system call the compiler emits prologue code to save the task's caller volatile registers before actually executing the system call. The system call correspondingly has code that saves/restores callee volatile registers. The compiler also emits epilogue code to restore the task's caller volatile registers before resuming execution of the task's code upon returning from the system call. For an assembly coded task making a system call, in an embodiment described below, a stub manages saving and restoring a task's caller volatile registers.

Operating systems and applications written in the high-level languages C++ and C will have system and task code, respectively, whose registers will work in accordance with the above rules. While according to the above description the CPU registers are divided into two categories, it would be appreciated by one of ordinary skill in the art that the present invention is not limited by number of categories. Furthermore, any generic software constructs which are alive or active when a task is running, including but not limited to task variables, can be treated as part of the non-volatile context that may include the non-volatile registers.

As indicated above, the registers are part of the state of the computing environment and are saved during the process of context switching. A particular task may use only some or none of the volatile registers and may or may not use the non-volatile registers. Consequently, during the process of context switching the volatile registers that are used are saved and the non-volatile registers are saved if and only if they are used. By not saving/restoring registers that are not being used, the execution overhead for the context switching process is reduced.

In an embodiment, each task 115 has a set of save/restore routines 117a_xs and 117a_xr (defined below) located in memory space 111 associated with it. Each set of save/restore routines saves/restores a certain combination of volatile CPU registers. One of ordinary skill in the art would appreciate that the combination of registers saved/restored by a particular routine in an embodiment based on the present invention is application dependent; consequently, the present invention is not limited to particular combinations of registers. Furthermore, the present invention is not limited to certain combinations of non-register information where the task context is information other than registers. Routine is defined herein as code that uses the minimal registers need to achieve its functionality, and the way a routine is called and executed depends on the processor architecture being used.

In an embodiment, system space 112 further includes a task context save restore (CSR) redirect table 117 of n entries, one entry for each task specific set of save/restore routines. Each entry contains two portions. The first portion is the address of save routine 117a_xs and the second portion is the address of restore routine 117a_xr, where "x" is the identifier for the task associated with the CSR routines as in "a" for task 115a, "b" for task 115b, and so forth, except as otherwise indicated herein. Furthermore, according to the exemplary embodiment n is 32, but one of ordinary skill in the art would appreciate that the present invention is not limited to a particular integer value for n. A method for associating save/restore routines with an entry in CSR redirect table 117 is described below. However, one of ordinary skill in the art would appreciate that there are various techniques for associating routines with a task or an entry in a redirect table.

While in one embodiment the save/restore routines 117a_xs and 117a_xr are scattered throughout memory space 110, in both user space 111 and system space 112, one of ordinary skill in the art would appreciate that in an alternative embodiment the save/restore routines are located all together in a context save/restore (CSR) routines table (not shown) in system space 112. In an alternative embodiment, the save/restore routines are stored in system space 112 but not in a table form. In an alternative embodiment, the CSR routines table is in user space 111. In an alternative embodiment, CSR redirect table 117 and a CSR routines table are combined into one structure.

In an embodiment where the routines in CSR routines table (not shown) are provided by the operating system (i.e., a task cannot provide its own task specific save/restore routines, and the registers saved/restored by the routines are known by the task developer), one of ordinary skill in the art would appreciate that in the event CSR routines table does not contain a save/restore routine which will save/restore only the registers used by task 115 and no other registers, execution overhead would be reduced by choosing for task 115 a value for CSR routine ID 135 such that routines are selected that will save/restore the combination of registers used by task 115 and less unused volatile registers than would be save/restored by any other save/restore routine in the CSR routines table. Generally speaking the fewer registers saved and restored the lower the execution overhead associated with context switching.

Figure 5A:
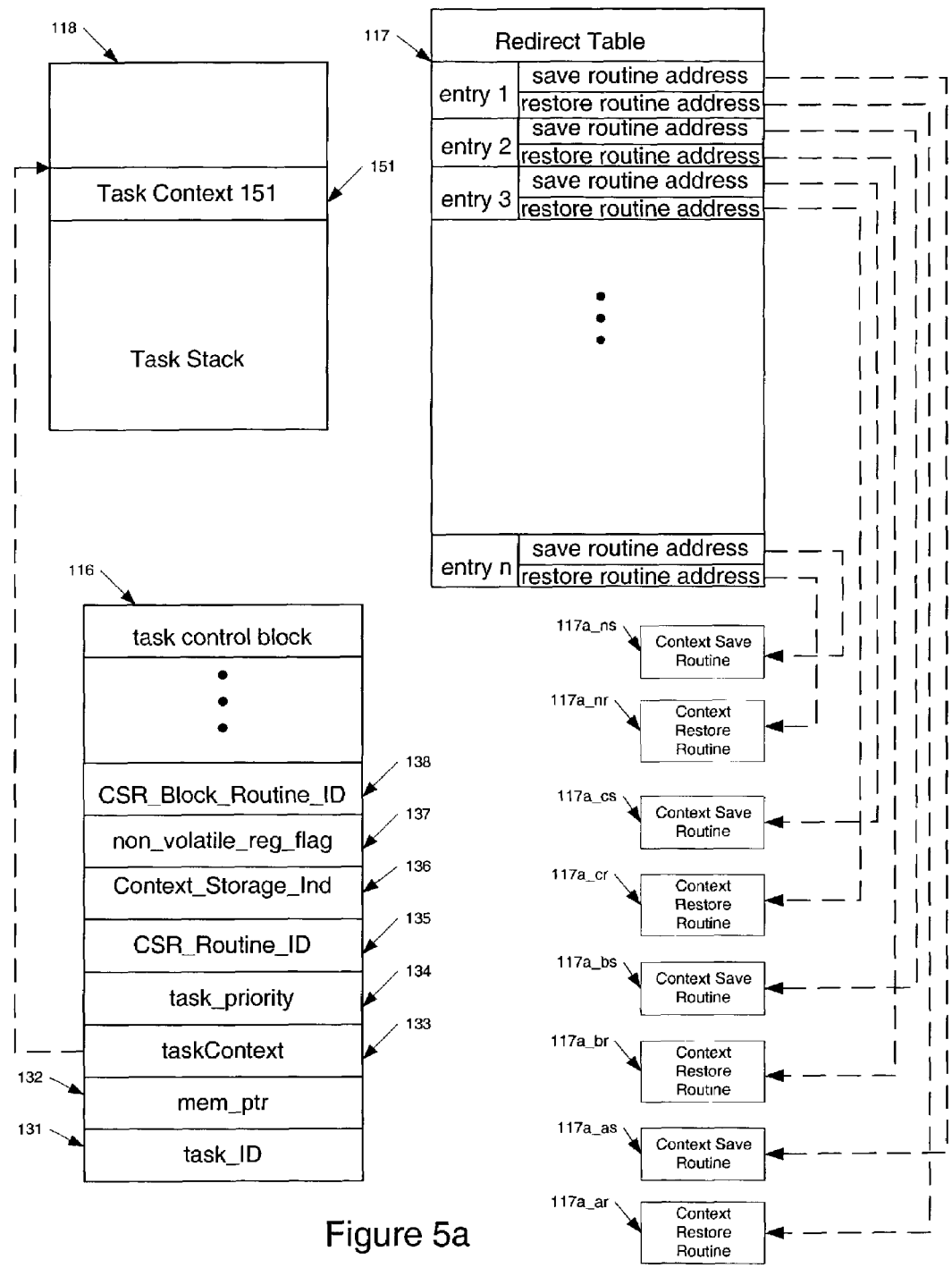
FIG. 5a provides further detail of the exemplary system task control block, task stack, CSR redirect table and context save and restore routines according to an embodiment of the present invention.

FIG. 5*a* provides further detail of a system task control block 116, task stack 118, and CSR redirect table 117 and context save and restore routines according to an embodiment of the present invention. Exemplary system task control block 116 contains task information data structures ("system TCB data structures") that the operating system 113 uses to manage tasks (for example, for context switching). In an alternative embodiment enforcing protection for memory space 110, information is stored in TCB 116 so that it will not be corrupted by user tasks. In this example, such task information data structures includes a task ID number 131, a memory space pointer 132 to the memory space allocated to the task, a taskContext pointer 133 (described below) to task context 151 (described below) stored in task stack 118, a task priority indicator 134, a context save/restore (CSR) routine ID 135 (described below), a context storage indictor 136 (described below) and a non-volatile register usage flag 137 (described below). Depending on the computer system, and the intended application, other task information could also be included in the system task control block 116.

According to an embodiment, the task information in system task control block 116 is used during context switching to save and restore the state of the computing environment 100 for task 115.

According to an embodiment, another part of the state of the computing environment is saved as task context 151 on task stack 118. The part of the state of computing environment that is saved on task stack 118 is a combination of CPU 101 registers. The combination of CPU 101 registers that is selected for storage on task stack 118 is referred to as task context 151. The teachings of the invention are not limited to saving CPU registers but, as one of ordinary skill in the art would appreciate, may be used in other applications for saving information other than CPU registers. For example, other information that is stored in the system task control block 116 or CPU information is a candidate for storage in task stack 118 according to the teachings of the present invention. As will become clear from the description below task context 151 may include, depending on the event leading to the storage of task context 151 on task stack 118, the CPU's program counter (PC) and system status register (SR).

As indicated above, context switching can arise in several situations which require task context to be stored. For example, a task such as task 115*a* can get interrupted. When a task such as task 115*a* gets interrupted, the program counter and the system status register (SR) of the CPU are placed on task stack 118*a* and the scheduler 122 selects based on the value of CSR routine ID 135*a* one of the addresses in CSR redirect table 117 to access store routine 117*a*__*xs* to store the volatile registers of task 115*a*. CSR routine ID 135 points to an entry in the CSR redirect table 117. Based on CSR routine ID 135*a*, scheduler 122 selects save routine 117*a*__*as* when switching out a task. Similarly based on CSR routine ID 135*a*, Scheduler 122 selects restore routine 117*a*__*ar* when doing a context switch-in of a task. Since interruption of task 115*a* may lead to context switching out, scheduler 122 selects save routine 117*a*__*as*.

In some systems, tasks may use non-compiler registers. Consequently, a task that is switched out may not run properly if before it is switched back in another task uses its non-compiler registers and corrupts them. Thus, the store and restore routines described above may include instructions for storing and restoring non-compiler registers where the tasks require it. As appropriate, a context store routine 117*a*__*xs* stores non-compiler registers and a context restore routine 117*a*__*xr* restores the non-compiler registers.

According to an embodiment, CSR routine ID 135 is a bitmask with a size of n bits, because n is the number of entries in redirect table 117. For example, CSR routine ID 135 is 32 bits long when there are 32 entries in redirect table 117. In an alternative embodiment, CSR routine ID 135 is not a bitmask, but rather a binary value equal to the number of entries in redirect table 117. In such a case, the size of CSR routine ID 135 may be set to accommodate the number of entries. For example, 32 table entries would require 5 bits, 48 entries would require 6 bits, and 100 entries would require 7 bits. Based on the value of CSR routine ID 135 and whether context switch-in or switch-out is occurring, one of the addresses in CSR redirect table 117 is selected in order to execute a task specific save routine 117*a* or a task specific restore routine 117*a*.

Each of the save/restore routines 117*a* saves/restores at least the volatile registers used by task 115*a* on task stack 118*a*. Preferably, the routine selected based on CSR routine ID 135 saves/restores only the volatile registers used by task 115*a*, in order to minimize execution overhead. Save routine 117*a*__*as* is executed to save on task stack 118*a* the volatile registers used by task 115*a*.

An ISR is then executed to process the interrupt. If the ISR did not make a higher priority task ready, scheduler 122 then sets taskContext pointer 133 to the top of task stack 118*a* so that task context 151, the volatile registers, can be restored from task stack 118*a* and execution of task 115*a* can resume. If the ISR makes a higher priority task, such as task 115*b*, ready, scheduler 122 examines non-volatile register usage flag 137*a* to determine whether non-volatile registers are being used. If non-volatile registers are being used by task 115*a* they are stored on task stack 118*a* as well. Scheduler 122 then sets taskContext pointer 133 to the top of task stack 118*a* so that task context 151, the volatile and non-volatile registers, can be later restored from task 118*a* when task 115*a* is switched in later. Scheduler 122 then stores a FULL_CONTEXT indication in context storage indictor 136 to indicate that task 115*a* had been preempted by a higher priority task. The FULL_CONTEXT indication is used to restore the stored task context off of task stack 118*a* when task 115*a* is later switched in to the CPU. If non-volatile registers are not being used by task 115*a*, a FULL_CONTEXT indication is stored in context storage indicator 136 to indicate that task 115*a* had been preempted by a higher priority task. The higher priority task that was made ready is then switched in.

According to one embodiment, a task, such as task 115*a*, invokes an operating system call in order to have the operating system associate a task specific save routine and restore routine with the task. For example, such an operating system call may be defined as follows: setCSRRtn (SaveRtn, RestoreRtn), where SaveRtn( ) and RestoreRtn( ) are the addresses of the task specific save or restore routine, respectively. SetCSRRtn( ) places the addresses of the routines in an empty entry in table 117. SetCSRRtn( ) then returns the number of the entry in CSR table 117 so that the save or restore routine can be invoked by the task. The number of the entry is assigned by a task such as task 115*a* to the CSR routine ID such as CSR routine ID 135. Since one of ordinary skill in the art would appreciate how to write a routine such as SetCSRRtn( ) and in order to not obscure the invention with unnecessary detail, SetCSRRtn( ) is not described herein.

According to an embodiment SaveRtn( ) is a routine that includes at least one push of a register on a stack such as task stack 118*a*. According to an alternative embodiment SaveRtn( ) is a routine that includes at least one instruction that saves information for later retrieval. According to an embodiment, RestoreRtn( ) is a routine that includes at least one pop of a register from a stack such as task stack 118*a*. According to an alternative embodiment RestoreRtn( ) is a routine that includes at least one instruction that retrieves information from a data structure.

Another situation that requires task context to be saved occurs when a task relinquishes the CPU. When a task such as task 115*a* relinquishes the CPU because it tried to make a system call to operating system 113 but a system resource was unavailable, scheduler 122 stores the task's callee volatile registers on task stack 118*a*. The task's callee volatile registers are available for storage on task stack 118*a* because they had been preserved by the system call function. They are made available to scheduler 122 so that scheduler 122 may store them on task stack 118*a* when the CPU is relinquished. Scheduler 122 then examines non-volatile register usage flag 137 to determine whether non-volatile registers are being used. If non-volatile registers are not being used by task 115*a* scheduler 122 sets taskContext pointer 133 to the top of task stack 118*a* so that task context 151 can be later restored from task stack 118*a* when task 115*a* is switched in the CPU. Scheduler 122 then stores a PARTIAL_CONTEXT indication in context storage indictor 136 to indicate that task 115*a* had relinquished the CPU. If non-volatile registers are being used by task 115*a* they are also stored on task stack 118*a*. Scheduler 122 then sets taskContext pointer 133 to the top of task stack 118*a* so that task context 151 can be later restored from task stack 118*a* when task 115*a* is switched in to the CPU. Scheduler 122 then stores a PARTIAL_CONTEXT indication in context storage indictor 136 to indicate that task 115*a* had relinquished the CPU. The PARTIAL_CONTEXT indication is used to restore the stored task context off of task stack 118*a* when task 115*a* is later switched in to the CPU. According to one embodiment when a task relinquishes the CPU because a system resource was not available in response to a system call, the task's caller volatile registers need not be stored. The task's caller volatile registers are not stored at the time the task relinquishes the CPU because the compiler used to create the task produced code that already stored the task's caller volatile registers at the time the system call was made. The structure of task stack 118*a* after the volatile registers and non-volatile registers have been stored on it and the operations that occur to store the registers will be described in greater detail below.

In an embodiment, the callee volatile registers are stored on the task stack because the operating system uses a system stack when a task makes a system call. When the task that made the system call relinquishes the CPU and a new task is switched in, the system stack is basically reset and allowed to be written over and used by the next task. The callee volatile registers that were stored on the system stack upon entry into the system call may not be there when the task that relinquishes the CPU is switched in later because the system stack locations may be written over by stack operations made by or on behalf of another task that is switched in after the task relinquishes the CPU. Consequently, the callee volatile registers are stored on the task stack so that they will be available when task 115*a* is switched in later.

While in one embodiment the callee volatile registers are stored on the task stack, in an alternative embodiment the callee volatile registers need not be stored upon relinquishing the CPU. It is not necessary to store the callee volatile registers in an alternative embodiment where the operating system uses the task stack of the task that made a system call when a system call is being executed. If in such an embodiment the operating system stored the callee volatile registers, it is not necessary to store them again upon relinquishing the CPU. In this alternative embodiment, if non-volatile registers are used they are stored on task stack 118*a* and a PARTIAL_CONTEXT indication is stored in task control block 116*a*.

Generally speaking it is not necessary to store the callee volatile registers again if they have been stored in a location that will not be used deliberately for storing other information before the callee volatile registers are restored from the location. As described above, in an embodiment the operating system stores the callee volatile registers on the system stack which may be written over before the callee volatile registers can be restored so the callee volatile registers are stored in the task stack.

In the event the compiler does not produce code to store the volatile registers at the time the system call was made, according to an alternative embodiment of the present invention, volatile registers are stored as described above in connection with task 115*a* becoming preempted due to an interrupt and non-volatile registers are stored on task stack 118*a* if they are used by task 115*a*. Scheduler 122 then sets taskContext pointer 133 to the value of the stack pointer of task stack 118*a* so that task context 151 can be later restored from task 118*a* when task 115*a* is switched in to the CPU. Scheduler 122 then stores a PARTIAL_CONTEXT indication in context storage indictor 136 to indicate that task 115*a* had relinquished the CPU. In alternative embodiments, all volatile registers maybe stored rather than being stored based on whether they are used, or all volatile registers maybe stored even if the compiler produces code to store volatile context, and non-volatile registers are stored only if used. In another alternative embodiment, volatile registers are stored only if used even if the compiler produces code to store volatile context, and non-volatile registers are stored only if used.

While in the above description a task uses compiler registers and the system call also used compiler registers, there may be systems in which tasks use non-compiler registers. In such situations improper operation may result if the non-compiler registers are not saved during context switch-out when a task relinquishes the CPU because a subsequent task that is switched-in may use the non-compiler registers of the task that was context switched-out before it is switched back in again. According to an alternative embodiment, when a task such as task 115a relinquishes the CPU because it tried to make a system call to operating system 113 but a system resource was unavailable, scheduler 122 stores the task's callee volatile registers on task stack 118a. Scheduler 122 then examines CSR Block Routine ID 138a in task block 115a to determine the routine to be used to store the non-compiler registers on task stack 118a.

Figure 5B:
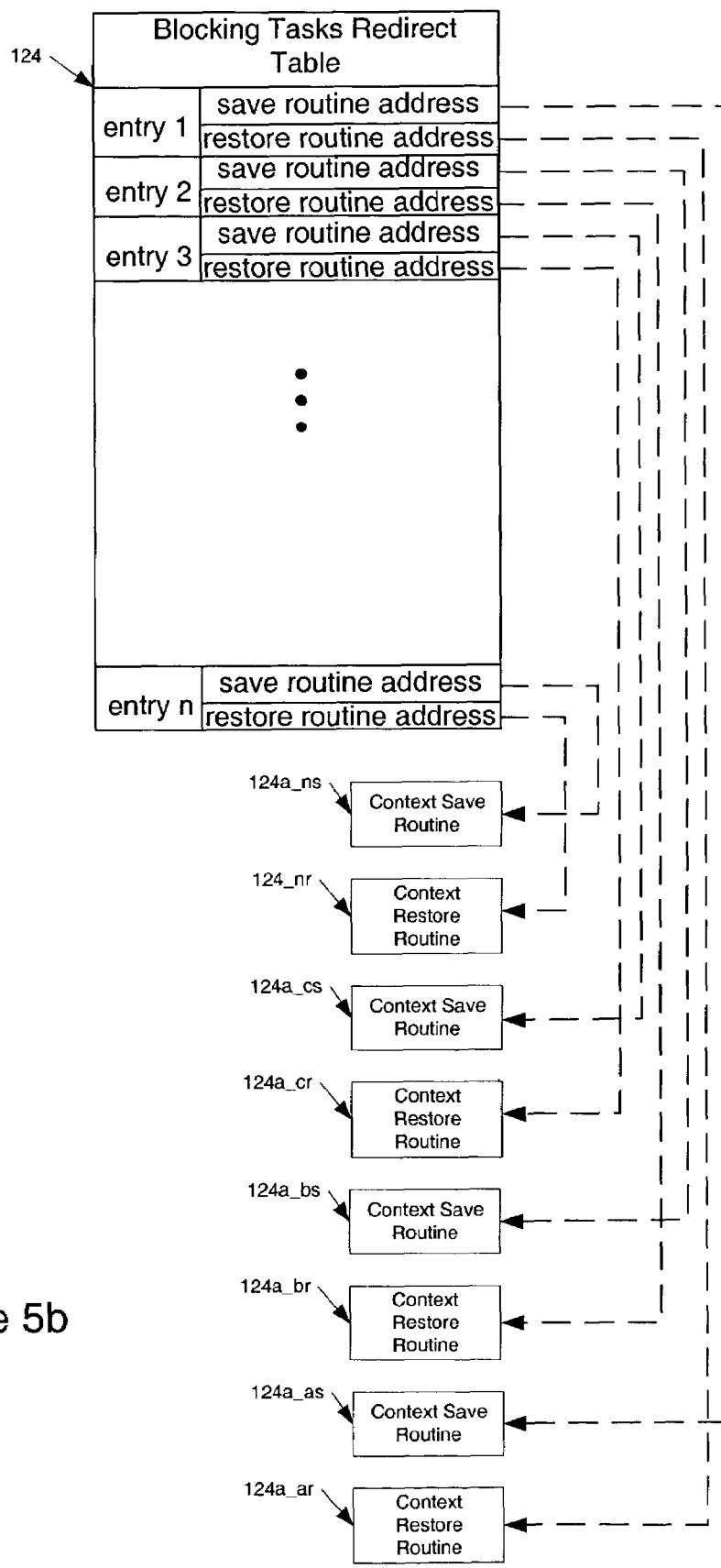
FIG. 5b illustrates a blocking tasks redirect table and blocking task context save and restore routines according to an embodiment of the present invention.

FIG. 5b illustrates a blocking tasks redirect table and blocking task context save and restore routines according to an embodiment of the present invention. Blocking tasks redirect table 124 has n entries, one entry for each task specific set of non-compiler register save/restore routines. Each entry contains two portions. The first portion is the address of save routine 124a_xs and the second portion is the address of restore routine 124a_xr, where "x" is the identifier for the task associated with the non-compiler register save/restore routines as in "a" for task 115a, "b" for task 115b, and so forth. In the example described herein, "n" is 32, but one of ordinary skill in the art would appreciate that the present invention is not limited to a particular integer value for n. A method for associating save/restore routines with an entry in Blocking tasks redirect table 124 is similar to the one described for table 117 and need not be repeated here. However, one of ordinary skill in the art would appreciate that there are various techniques for associating routines with a task or an entry in a redirect table.

Based on CSR Block Routine ID 138a, scheduler 122 selects a routine 124a_xs from blocking tasks redirect table 124 and saves non-compiler registers used by task 115a. According to one embodiment, even if a task does not use non-compiler registers it still has routines in table 124a but they do nothing. Scheduler 122 then examines non-volatile register usage flag 137 to determine whether non-volatile registers are being used. If non-volatile registers are not being used by task 115a scheduler 122 sets taskContext pointer 133 to the top of task stack 118a so that task context 151 can be later restored from task stack 118a when task 115a is switched in the CPU. Scheduler 122 then stores a PARTIAL_CONTEXT indication in context storage indictor 136 to indicate that task 115a had relinquished the CPU. If non-volatile registers are being used by task 115a they are also stored on task stack 118a. Scheduler 122 then sets taskContext pointer 133 to the top of task stack 118a so that task context 151 can be later restored from task 118a when task 115a is switched in the CPU. Scheduler 122 then stores a PARTIAL_CONTEXT indication in context storage indictor 136 to indicate that task 115a had relinquished the CPU. The PARTIAL_CONTEXT indication is used to restore the stored task context off of task stack 118a when task 115a is later switched in to the CPU. According to one embodiment when a task relinquishes the CPU because a system resource was not available in response to a system call, the task's caller volatile registers need not be stored. The task's caller volatile registers are not stored at the time the task relinquishes the CPU because the compiler used to create the task code produced code that already stores the task's caller volatile registers at the time the system call is made. The structure of task stack 118a after the volatile registers and non-volatile registers have been stored on it and the operations that occur to store the registers will be described in greater detail below.

Receiving an interrupt during context switch-in is another situation in which task context is saved. When a task such as task 115a gets interrupted during context switch-in, the volatile registers for task 115a are stored in interrupted switch-in save area 119 in system space 112. A task that is interrupted during context switch-in does not yet have a stack on which registers can be stored (i.e., its stack has not been made valid yet). Consequently, when an interrupt occurs during context switch-in of a task, the interrupted task's volatile registers cannot be stored on the task's stack but are stored in interrupted switch-in save area 119. Whether the volatile registers will be retrieved from interrupted switch-in save area 119 or discarded depends on whether the ISR that runs due to the interrupt makes a higher priority task ready. According to one embodiment, if a higher priority task is made ready the values for the volatile registers in interrupted switch-in save area 119 are ignored and may be written over later by the volatile registers of another or the same task. If on the other hand the ISR does not make a higher priority task ready, then the task that was interrupted resumes context switch-in and the volatile registers of the interrupted task are retrieved from interrupted switch-in save area 119.

While typically a task written in a high-level language such as C or C++ may use only a single value for CSR routine ID 135 while running, an assembly language task may modify the value in CSR routine ID 135. For example, assume task 115c is an assembly language task. Depending on the volatile registers saved by 117cs, an assembly language task such as task 115c may change the value of CSR routine ID 135c before a system call is made. Because scheduler 122 selects a save/restore routine to save/restore volatile registers based on CSR routine ID 135c and an assembly language task often uses volatile registers different than those used by a system call, CSR routine ID 135c often needs to be changed by the assembly language task before the system call is made. CSR routine ID 135c is changed because if an interrupt happens during the execution of the system call the volatile registers that the assembly language task wants saved will be saved but the volatile registers that the system call wants saved may not be saved.

To allow the volatile registers of the system call to be saved, in the exemplary embodiment, assembly language tasks make system calls by first making a call to an operating system provided assembly to system call stub 123. Stub 123 may be provided by the developer of the operating system in order to further minimize the possibility that the developer of code for a task may develop code that may interfere with the operation of other tasks or the operating system. According to one embodiment, the assembly language task passes to the stub: an identifier for the system call, the parameters needed by the system call, the starting addresses of the assembly language task's save/restore routines, save routine 117cs and restore routine 117cr (for both refer to FIG. 4), for volatile registers and the CSR routine ID that the task uses. The assembly language task's save/restore routines are a sequence of pushes and pops, respectively, of the volatile registers used by assembly language task 115c.

On behalf of assembly language task 115c stub 123 stores CSR routine ID 135c on task stack 118c then stub 123 then loads default CSR routine ID 117b (refer to FIG. 4) into CSR routine ID 135c. According to an embodiment, default CSR routine ID 117b points to a set of default routines that save/restore all the volatile registers, such as default save routine 117ds (refer to FIG. 4) for saving and default restore routine 117dr (refer to FIG. 4) for restoring in system space 112. The volatile registers used by assembly language task 115c are then saved onto stack 118c by accessing save routine 117cs at the address passed by assembly language task 115c. If an interrupt were to happen while the system call was being executed, using default CSR routine ID 117b scheduler 122 would access entry 1 in table 117 to retrieve the address of default save routine 117ds, and then routine 117ds would be executed to save the volatile registers used by the system call. After the volatile context is saved, stub 123 then makes the system call. When the system call returns, stub 123 accesses restore routine 117cr at the address passed by assembly language task 115c to restore the volatile context from stack 118c and return it to the proper CPU registers. Then stub 123 pops off stack 118c the task specific CSR routine ID associated with task 115c and restores it to CSR routine ID 135c in system task control block 116c. Stub 123 then returns control to task 115c.

While in the above description an assembly language task makes a system call by making a call to a stub, it would be appreciated by one of ordinary skill in the art that in an alternative embodiment the same operations described above as being performed by the stub can be performed by the assembly language task either as inline code or as a call to a routine written by the assembly language developer rather than a standard one provided by the developer of the operating system for the use by assembly language tasks from multiple developers.

It would be appreciated by one of ordinary skill in the art that context switching events can happen during execution of an assembly language task, such as task 115c. Consequently, the above description of the exemplary embodiment with respect to saving task context in response to an interrupt or as a prior to relinquishing the CPU is also applicable to assembly language tasks and need not be repeated.

Figure 6:
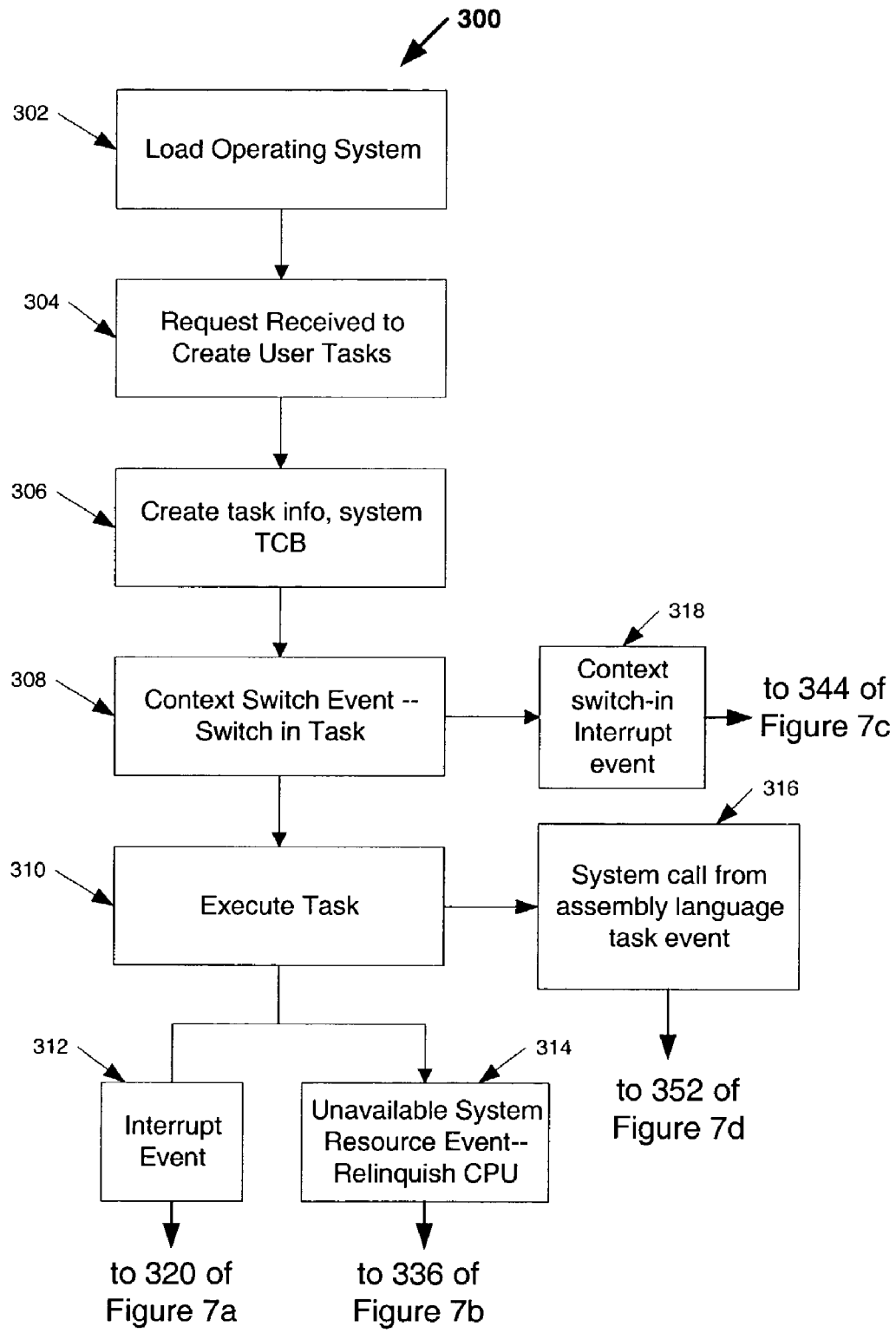
FIG. 6 illustrates a process for loading and executing an operating system and tasks including receiving events that lead to context switching according to an embodiment of the present invention.

FIG. 6 illustrates a process for loading and executing an operating system and tasks including receiving events that lead to context switching according to an embodiment of the present invention. In process 300, the operating system 113 is loaded and executed 302. The execution of the operating system 113 may include the creation of various system objects and tasks, including a scheduling task that allocates system resources among tasks executing in the computing environment 100.

Operating system 113 receives 304 a request (for example, from a user) to perform functions in software modules 114a, 114b, and 114c. Operating system 113 creates 306 tasks 115a, 115b, and 115c to execute the respective functions, by generating task information for each task. Task creation may involve assigning a task ID number to the new task, assigning a memory location at which to begin execution of the executable code associated with the predetermined function, assigning an area of memory for use by the task during execution, as well as the assignment of other task information. Operating system 113 also creates system task control block 116 corresponding to each task 115, and inserts the assigned task information for each task 115 into the system TCB data structures of each respective system task control block 116a. System 113 also associates for each task the task's specific CSR routines during task creation. The task specific CSR routines are identified by the CSR routine ID and which was returned earlier through setCSRRtn( ). Similar steps are performed by the operating system 113 for task 115b, and 115c. Tasks 115a, 115b and 115c are identified to the system scheduling object, which includes the tasks 115a, 115b, and 115c in the scheduling algorithm being used for the sharing of the computing resources in the computing environment 100.

A context switching event occurs 308 allowing a task such as task 115a described above to be switched-in to the CPU. If switch-in of task 115a occurred without an interrupt happening that caused task 115a to be switched-out, task 115a executes 310.

Figure 7A:
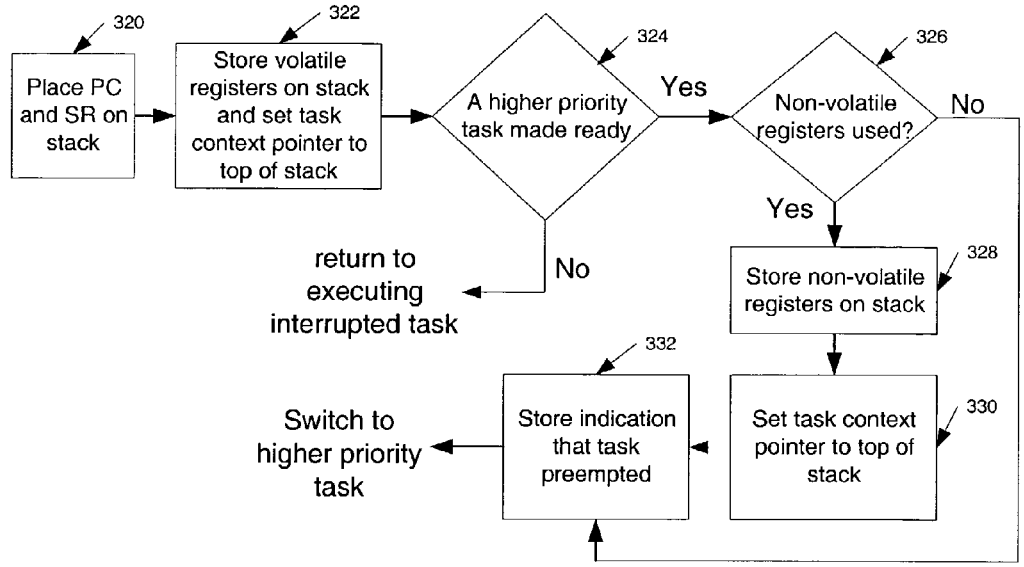
FIG. 7a illustrates a process for storing task context in response to an event that may cause task preemption according to an embodiment of the present invention.

Execution of task 115a is disrupted 312 by an interrupt event. FIG. 7a illustrates a process for storing task context in response to an event that may cause task preemption according to one embodiment of the present invention. Process 300 continues on FIG. 7a where in response to the interrupt event the program counter and the system status register (SR) of the CPU are placed 320 on task stack 118a and the volatile registers of task 115a are stored 322 on task stack 118a. To store the volatile registers of task 115a on task stack 118a, scheduler 122 examines CSR routine ID 135a in system task control block 116a and based on the value of CSR routine ID 135a accesses the appropriate entry in redirect table 117 to get the address of save routine 117a_as. The save routine 117a_as is executed to save the volatile registers of task 115a on task stack 118a.

After the ISR is completed, it is then determined 324 whether the ISR made a higher priority task, such as task 115b, ready. If the ISR did not make a higher priority task ready, Scheduler 122 then sets 334 taskContext pointer 133 of system task control block 116a to the top of task stack 118a so that task context 151, the volatile registers, can be later restored from task stack 118a. Execution resumes with task 115a which had been interrupted after the volatile registers stored on stack 118a are restored.

If the ISR made a higher priority task, such as task 115b, ready, scheduler 122 examines non-volatile register usage flag 137a to determine 326 whether non-volatile registers are being used. If non-volatile registers are not being used by task 115a scheduler 122 then stores 334 a FULL_CONTEXT indication in context storage indictor 136 to indicate that task 115a was preempted. If non-volatile registers are being used by task 115a scheduler 122 stores 328 them on task stack 118a as well. Scheduler 122 then sets 330 taskContext pointer 133 to the top of task stack 118a and then stores 332 taskContext pointer 133 in system task control block 116a so that task context 151, the volatile and non-volatile registers, can be later restored from task 118a when task 115a is switched in the CPU. Scheduler 122 then stores 332 a FULL_CONTEXT indication in context storage indictor 136 to indicate that task 115a was preempted. The higher priority task that was made ready by the ISR is then switched in.

While in the above description, setting taskContext pointer 133 means having it point to the top of the stack where top of the stack is the next free location that information would be stored at if a storage operation would be performed on the stack. It would be appreciated by one of ordinary skill in the art that where any pointer, for example taskContext pointer, points depends on the type of data structure used and how information is added to the data structure. In alternate embodiments (e.g., stacks that grow down in memory), taskContext pointer may point to the bottom of the stack in order for task context to be later restored from the stack.

FIG. 8a illustrates the stack of a preempted task in the case where both non-volatile registers and volatile registers are stored. In this example, stack 800 grows from a low address at the bottom of the stack 812 to high addresses as information is stored on it. Stack 800 is representative of stack 118 after it is populated by task context due to task preemption. When an interrupt happens while a task is being executed, program counter (PC) 810 and system status register (SR) 808 are pushed on to stack 800. According to one embodiment the PC and SR are pushed on to the stack when an ISR is entered in response to an interrupt. Volatile registers 806 are then stored using the task specific CSR routine ID and the task specific save/restore routine as described above in connection with FIG. 4 and FIG. 5. It is then determined whether the task that was interrupted is going to be preempted because the interrupt made a higher priority task ready. According to one embodiment this determination is made when an ISR is about to be exited. If a higher priority task was made ready, the non-volatile registers are pushed onto stack 800 if, after checking the non-volatile register usage flag 137, it is determined that the task that was interrupted uses non-volatile registers. Because in this example the task that was interrupted uses non-volatile registers, after the non-volatile registers are pushed onto stack 800 stack pointer 802 points to the address, 2E0, of free location 801 after the last memory location used by the non-volatile registers. If the task that was interrupted did not use non-volatile registers, stack pointer 802 would point to address 290. If a higher priority task was not made ready, on exiting the ISR the volatile registers are restored using the task specific CSR routine as described above, and the SR and PC are popped off and placed in the CPU in order to for it to resume execution of the interrupted task at the proper address.

Figure 7B:
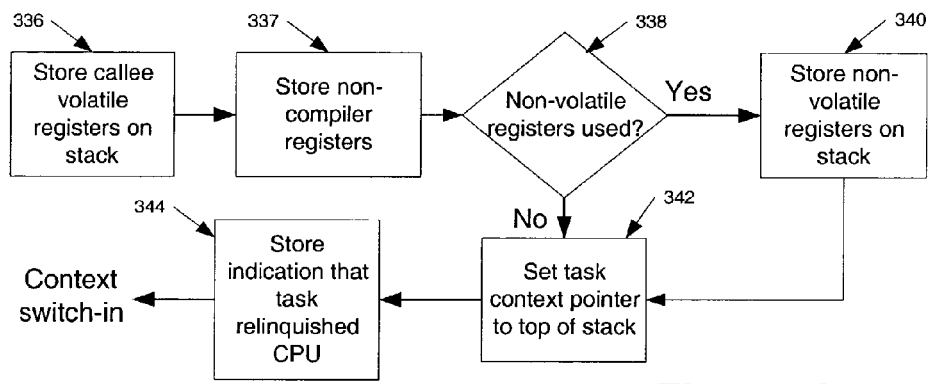
FIG. 7b illustrates a process for storing task context in response to an event that may cause the CPU to be relinquished.

Returning to FIG. 6, an unavailable system resource event may occur 314 when task 115*a* makes a system call causing task 115*a* to relinquish the CPU. FIG. 7*b* illustrates a process for storing task context in response to an event that may cause the CPU to be relinquished. Scheduler 122 stores 336 callee non-volatile registers on task stack 118*a*. Scheduler 122 then uses CSR Block Routine ID 138*a* to select routine 124*a__as* from blocking tasks redirect table 124 to save 337 non-compiler registers if any used by task 115*a*. According to an alternative embodiment, non-compiler registers are not saved and scheduler 122 examines non-volatile register usage flag 137 after storing 336 callee non-volatile registers and continues the process illustrated in FIG. 7*b*. Scheduler 122 then examines non-volatile register usage flag 137 to determine 338 whether non-volatile registers are being used. If non-volatile registers are being used by task 115*a* they are stored 340 on task stack 118*a*. Scheduler 122 then sets 342 taskContext pointer 133 to the value of the stack pointer of task stack 118*a* so that task context 151 can be later restored from task stack 118*a* when task 115*a* is switched in the CPU. Scheduler 122 then stores 344 a PARTIAL_CONTEXT indication in context storage indictor 136 to indicate that task 115*a* has relinquished the CPU. According to one embodiment, when a task relinquishes the CPU because a system resource was not available in response to a system call, the volatile registers need not be stored. The volatile registers are not stored at the time the task relinquishes the CPU because the compiler used to create the task code produced code that already stored the volatile registers at the time the system call was made.

FIG. 8*b* illustrates the stack of a task that relinquished the CPU and had both volatile registers and non-volatile registers stored before relinquishing the CPU. Stack 850 is representative of stack 118 after it is populated by task context due to the task relinquishing the CPU. A task may relinquish the CPU when a system call cannot be completed. A compiler that produces executable code for a task produces code that stores volatile context making it unnecessary to store it again when the task relinquishes the CPU. For example, when a task makes a system call the volatile registers of the task making the call are pushed onto stack 850 as caller volatile context 864. The compiler that generated code for the task's system call also produces C prologue code to pop the task's caller volatile registers off of stack 850. When a system call is made, the compiler produced code pushes the task's caller volatile registers onto on the stack, making it not necessary to store the volatile registers again when it is determined that the system call cannot be completed (i.e., the system resource is not available at the present time) and the CPU is relinquished. The CPU's program counter is also stored on stack 850 as PC 862. The system status register, which is also the task's status register, before making the system call, is stored as SR 860. Program counter 862 points to the compiler emitted C epilogue code which when executed restores the caller volatile context and then resumes execution with the next instruction in the task code after the system call. When the operating system code associated with the system call is executed, the volatile registers used by the system call are stored as callee volatile context 858. Also, when the system call is executed, the operating system code stores the program counter and system status register on stack 850 as PC 856 and SR 854, respectively. PC 856 points to the address of the operating system's system call epilogue code which is code that will allow the callee volatile context 858 to be restored by the operating system as part of the return path from the system call. SR 854 is the system status register after making the system call. If non-volatile registers are being used by the task they are saved on stack 850 as non-volatile context 852. Because in this example the task that relinquished the CPU uses non-volatile registers, after the non-volatile registers are pushed onto stack 850 stack pointer 868 points to the address, 390, of free location 851 after the last memory location used by the non-volatile context 852. If the task that was interrupted did not use non-volatile registers, stack pointer 868 would point to address 300.

Figure 7C:
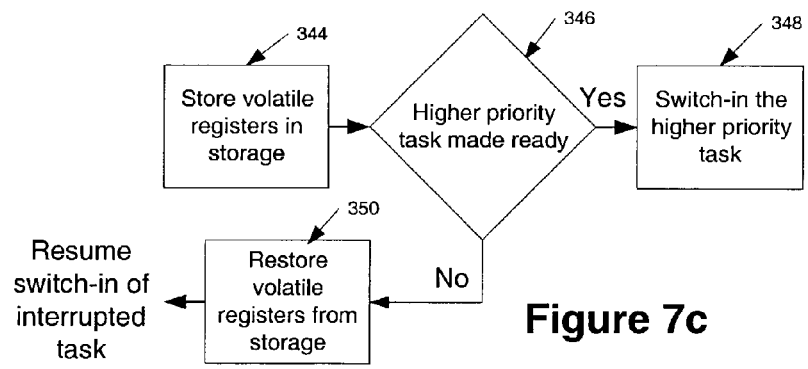

Returning to FIG. 6, a context switch-in interrupt event may occur 318 when task 115*a* is being switched in and an interrupt occurs disrupting the switching in of task 115*a*. FIG. 7*c* illustrates a process for storing task context in response to an interrupt during task switch-in. When a task such as task 115*a* gets interrupted during context switch-in, the volatile registers for task 115*a* are stored 344 in interrupted switch-in save area 119 in system space 112 by scheduler 122 After the ISR is completed, scheduler 122 then determines whether 346 a higher priority task was made ready. If a higher priority task was made ready, then the higher priority task is switched-in 348. If a higher priority task was not made ready, then scheduler 122 restores 350 the volatile registers from switch-in save area 119 and switch-in of interrupted task 115*a* then resumes.

Assume for the purposes of this example that the task being executed 310 in FIG. 6 is task 115*c* which is an assembly language task. A system call from an assembly language task event may occur 316 when task 115*c* makes a system call. FIG. 7*d* illustrates a process for adjusting for different task context storage requirements before a transition is made between types of code that have different task context storage requirements.

To allow the volatile registers of the system call to be saved, in the exemplary embodiment, assembly language task 115*c* makes system calls by first making 351 a call to an operating system provided assembly to system call stub 123. Stub 123 may be provided by the developer of the operating system in order to further minimize the possibility that the developer of code for a task may develop code that may interfere with the operation of other tasks or the operating system. As described above, task 115*c* passes to stub 123 parameters that allow stub 123 to save the volatile context for the assembly language task, adjust the options for storing task context, and make the system call on behalf of task 115c.

After stub 123 is called, on behalf of assembly language task 115c stub 123 stores 352 CSR routine ID 135c on task stack 118c then stub 123 then loads 354 default CSR routine ID 117b (refer to FIG. 4) into CSR routine ID 135c. The caller volatile registers used by assembly language task 115c are then saved 356 onto stack 118c by accessing save routine 117cs at the address passed by assembly language task 115c and the system call is made. When the system call returns, stub 123 accesses restore routine 117cr at the address passed by assembly language task 115c to restore 358 the caller volatile registers from stack 118c and return it to the proper CPU registers. Then stub 123 pops off stack 118c the task specific CSR routine ID associated with task 115c and restores 360 it to CSR routine ID 135c in system task control block 116c. Stub 123 then returns 361 control to task 115c.

While in the above description of the exemplary embodiment an assembly language task such as task 115c made a call to a stub such as stub 123 to adjust the task context storage options before a transition is made between code types it would be appreciated by one of ordinary skill in the art that such a call is not necessary. In an alternative embodiment, the operations performed by the stub may be performed by the task itself using inline code or a routine shared by several tasks developed by a common developer. Furthermore, while in the above description stub 123 stored caller volatile registers, one of ordinary skill in the art would appreciate that in alternative embodiments other volatile information or software constructs could be stored as well.

Figure 9:
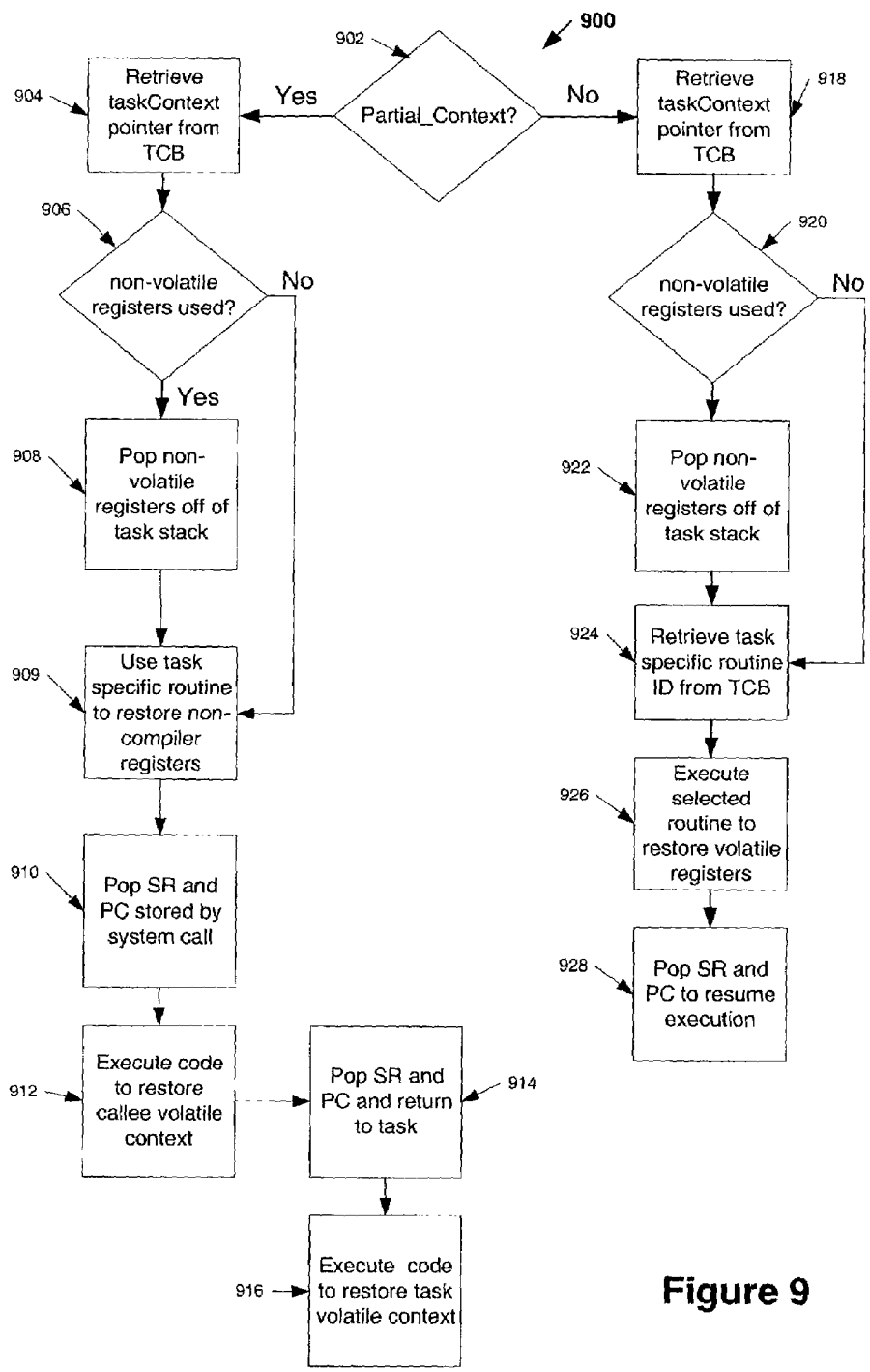
FIG. 9 illustrates a process for restoring context according to one embodiment of the present invention.

FIG. 9 illustrates a process for restoring context according to one embodiment of the present invention. While in the description below, process 900 is described in connection with restoring context for task 115a it should be appreciated that process 900 is not limited to restoring context for any particular task. In process 900, it is determined whether 902 a task such as task 115a relinquished the CPU. For example, Context_Storage_Ind 136 in TCB 116a can be examined for the presence of a PARTIAL_CONTEXT indication. If task 115a relinquished the CPU, then taskContext pointer 133 is retrieved 904 from system task control block 116a. It is then determined whether 906 non-volatile registers are used by examining non-volatile register usage flag 137a. If non-volatile registers are used, then non-volatile registers are popped off 908 of task stack 118a and restored to the CPU. CSR Block Routine ID 138a is then examined to find the appropriate routine to restore the non-compiler registers used by task 115a if any and they are restored 909. Then CSR Block Routine ID 138a is examined to find the appropriate routine to restore the non-compiler registers used by task 115a and they are restored 909. The SR and PC stored by the system call are then popped off 910 of stack 118a. The system call epilogue is then executed 912 to restore the callee volatile context (i.e., the system call's volatile context). The SR and PC stored by task 115a are then popped off 914 to return to task 115a. The compiler's prologue code is then executed 916 to restore task 115a's volatile context.

If tasks are known to never use non-compiler registers then, according to one embodiment, a system does not include a CSR Block Routine ID 138 or table 124. Correspondingly, in such an embodiment, the corresponding process for switching out would not need to store 337 non-compiler registers during switch out in process illustrated in FIG. 7b. Similarly, during switch-in restoration 909 of non-compiler registers of process 900 of FIG. 9 would be missing.

If task 115a did not relinquish the CPU (i.e., it was interrupted, FULL_CONTEXT), then taskContext pointer 133 is retrieved 918 from system task control block 116a. In this situation Context_Storage_Ind 136 in TCB 116a would store a FULL_CONTEXT indication. It is then determined whether 906 non-volatile registers are used by examining non-volatile register usage flag 137a. If non-volatile registers are not used, then CSR routine ID 135a is retrieved to get the entry in redirect table 117 that contains the address of restore routine 117ar. Restore routine 117a_ar is then executed 928 to restore the volatile registers. The SR and PC are then popped 930 off of stack 118a and execution resumes. If non-volatile registers are used the non-volatile registers are popped 922 off of the stack and then CSR routine ID 135a is retrieved and restore routine 117a_ar is executed.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A method being stored as a set of instructions on a computer-readable medium, the set of instructions being executable by a processor to perform the method, the method comprising:
   receiving an event leading to a context switch;
   determining whether a user task uses first task context information by examining a first task context information indicator in a task data structure associated with the user task;
   storing the first task context information in a temporary memory for use following the context switch only if the user task uses the first tank context information;
   setting a context pointer so that the first task context information can be retrieved from the temporary memory; and
   storing, in the task data structure, a context storage indicator indicative of the organization of information including the first task context information on the temporary memory.

2. The method of claim 1, wherein the temporary memory is a stack.

3. The method of claim 2, wherein the context pointer is stored in the task data structure.

4. The method of claim 3, wherein the task data structure is a task control block.

5. The method of claim 1, wherein the first task context information is at least one non-volatile register.

6. The method of claim 1, further comprising storing second task context information used by a second task in the temporary memory.

7. The method of claim 6, wherein the setting of the context pointer permits the retrieval of both the second task context information and the first task context information from the temporary memory.

8. The method of claim 6, wherein the second task context information is at least one volatile register.

9. The method of claim 6, wherein the second task context information is at least one callee volatile register.

10. The method of claim 6, further comprising storing non-compiler registers in the temporary memory.

11. The method of claim 6, further comprising storing non-compiler registers in the temporary memory.

12. The method of claim 6, further comprising making ready a second user task which has a higher priority than the user task.

13. The method of claim 12, further comprising storing a context storage indicator indicative of the event leading to the context switch.

14. The method of claim 13, wherein making the second user task ready cause the higher priority task to preempt the user task and the context storage indicator indicates that the event leading to the context switch was the user task being preempted.

15. The method of claim 6, wherein the storing includes selecting from a set of routines that stores the second context information.

16. A method being stored as a set of instructions on a computer-readable medium, the set instructions being executable by a processor to perform the method, the method comprising:
    receiving an event leading to a context switch;
    determining whether a user task uses first task context information by examining a first task context information indicator in a task data structure associated with the user task;
    storing the first task context information in a temporary memory for use following the context switch only if the user task uses the first task context information;
    setting a context pointer so that the first task context information can be retrieved from the temporary memory; and
    storing in the task data structure a context storage indicator indicative of the event leading to the context switch.

17. The method of claim 16, wherein the event leading to the context switch is the task relinquishing processing.

18. The method of claim 16, wherein the event leading to the context switch is the task relinquishing processing due to an unavailable system resource.

19. The method being stored as a set of instructions on a computer-readable medium, the set of instructions being executable by a processor to perform the method, the method comprising:
    executing first code for a first user task, the first code requiring first task context information to be saved in the event of a context switch;
    receiving an indication to make a transition to execute second code for a second task, the second code requiring second context information to be saved in the event of the context switch the second context information being at least partially different than the first task context information;
    saving in a temporary memory an identifier for a first routine that saves the first task context information, storing in a task data structure associated with the first user task a default identifier for a second routine that saves the second context information; and
    saving the first task context information in the temporary memory.

20. The method of claim 19, wherein the temporary memory is a task stack and the task data structure is a task control block.

21. The method of claim 19, further comprising executing the second code.

22. The method of claim 21, further comprising:
    returning to execute the first code after finishing execution of the second code;
    retrieving the identifier from the temporary memory; and
    storing the identifier in the task data structure.

23. A method being stored as a set of instructions on a computer-readable medium, the set of instructions being executable by a processor to perform the method, the method comprising:
    receiving an event;
    determining whether the event leads to a context switch;
    wherein if the event leads to the context switch, determining, by examining a first task context information indicator in a task data structure associated with a user task, whether the user task uses first task context information; and
    initiating an execution of function comprising a second set of instructions storing the first tank context information in a temporary memory for use following the context switch, setting a context pointer so that the first task context information can be retrieved from the temporary memory and storing, in the task data structure, a context storage indicator indicative of the organization of information including the first task context information on the temporary memory, only if the user task uses the first task context information.

* * * * *